US006542540B1

(12) United States Patent
Leung et al.

(10) Patent No.: US 6,542,540 B1
(45) Date of Patent: Apr. 1, 2003

(54) INTEGRATED ANALOG ADAPTIVE EQUALIZER

(75) Inventors: Vincent W. Leung, Monmouth Junction, NJ (US); John M. Khoury, New Providence, NJ (US); Reza Shariatdoust, Califon, NJ (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/217,718

(22) Filed: Dec. 21, 1998

(51) Int. Cl.[7] .............................. H03H 7/30; H03H 5/00; G06F 17/10
(52) U.S. Cl. ....................... 375/232; 333/28 R; 708/322
(58) Field of Search ................................. 375/232, 229, 375/233, 222, 329, 279; 379/410; 708/322, 323; 333/28 R, 24 R (56) References Cited

U.S. PATENT DOCUMENTS

| 5,680,070 A | * | 10/1997 | Anderson et al. ........... 327/336 |
| 5,757,803 A | * | 5/1998 | Russell et al. .............. 370/494 |
| 6,226,322 B1 | * | 5/2001 | Mukherjee .................. 375/229 |

FOREIGN PATENT DOCUMENTS

EP        0 467 412 A2    7/1991

OTHER PUBLICATIONS

"PEB 2095 ISDN Two–Wire Transmission Device" by Georg J. Smolka et al., Siemens Components, vol. 23, No. 1, Feb. 1988 (1988–02), pp. 17–21, XP000005224, Munich, DE, ISSN: 0945–1137, p. 19, middle column, paragraph 2–page 10, left–hand column, paragraph 1.

"Line and receiver interface circuit for high–speed voice–band modems" by Fischer et al., IEEE Journal of Solid–State circuits, vol. 22, No. 6, Dec. 1987 (1987–12), pp. 982–989, XP000001954, New York, US ISSN: 0018–9200, p. 982, right–hand column, paragraph 2–paragraph 3.

"A Direct Equalization Method", by Chen, IEEE International Conference On Acoustics, Speech, and Signal Processing, 21–24 Apr. 1997, pp. 2505–2508, XP000735068, New York, US ISBN: 0–8186–7920–4, p. 2507, left–hand column, paragraph 2.

Khoury, John M. and Tsividis, Yannis P., "Analysis and Compensation of High–Frequency Effects in Integrated MOSFET–C Continuous–Time Filters," *IEEE Trans. Circuits Syst.*, vol. CAS–34, No. 8 (Aug. 1987): 862–875.

* cited by examiner

*Primary Examiner*—Chi Pham
*Assistant Examiner*—Khai Tran
(74) *Attorney, Agent, or Firm*—Samuels, Gauthier & Stevens, LLP (57) ABSTRACT

An adaptive equalizer provides different degrees of high frequency boosts to the received signal, while retaining a relatively constant phase shift for each boost setting. The response of the equalizer is controlled by a control circuit (e.g., a digital signal processor) to compensate for the high frequency signal attenuation primarily caused by the signal path. For example, the signal path may include a telephone line between the communications system (e.g., a modem) and the central office. The dynamic response of the equalizer is selected based upon the characteristics of the signal path which the receive signal travels along. The equalizer may receive single ended or doubled ended signals. Advantageously, the equalizer conditions the received signal to ensure efficient utilization of the dynamic range of the ADC located in the receive circuit path. The equalizer is suitable for on-chip implementation, resulting in lower cost and power consumption.

16 Claims, 9 Drawing Sheets

| Gain (dB) at 1.1 MHz | $\omega_z$ (MHz) | $\omega_0$ (MHz) | Q | $R_a$ (KΩ) | $R_b$ (KΩ) | C (pF) | $C_k$ (pF) | Comments |
|---|---|---|---|---|---|---|---|---|
| 1 | 20.4 | 0.28 | 0.98 | 0.707 | 42.43 | 21.21 | 5.424 | 65.09 | Maximum Boost |
| 2 | 14.7 | 0.40 | | | | | | 32.54 | |
| 3 | 9.5 | 0.56 | | | | | | 16.27 | |
| 4 | 5.1 | 0.80 | | | | | | 8.14 | |
| 5 | -4.6 | — | | | | | | 0 | No Boost (Lowpass) |

INTEGRATED ANALOG ADAPTIVE EQUALIZER

BACKGROUND OF THE INVENTION

The present invention relates to communications, and in particular to an adaptive analog equalizer.

Due to the widespread popularity of the World Wide Web, internet traffic is at an all time high and rapidly increasing. The resulting congestion is taking its toll on users and telephone companies alike. Users are often frustrated by the length of time it takes to download complex graphics and videos. For example, a ten megabyte video clip which is the equivalent of a four minute movie, takes approximately ninety-three minutes using a 14.4 kilobyte modem and forty-six minutes using a 28.8 kilobit modem.

In addition, lengthy data transmissions are tying up telephone company switches that were designed to handle brief telephone calls. Broadband modems, and in particular asymmetric digital subscriber line (ADSL) modems are an emerging technology that promises to dramatically increase the ability to transfer data over conventional telephone lines. Significantly, ADSL modems allow data transfers at rates over two hundred times faster than current modems, and over ninety times faster than ISDN lines.

ADSL was originally conceived of as a technology for delivering interactive multimedia services, such as video on demand over existing telephone networks. However, it is internet access that is currently driving the demand for ADSL. Unlike other high speed data transmission technologies such as ISDN, ADSL requires no massive rewiring or other changes to a telephone company's local exchange or central office. Notably, ADSL modems use the existing telephone infrastructure, including the so-called "last mile" of the network, which is the leg from the central office to a subscriber site (e.g., a home or office) that uses a twisted pair of copper lines. Although it is often referred to as the "last mile", the leg from the central office to the subscriber site is typically about 12,000–18,000 feet long.

The bandwidth of a conventional copper twisted pair telephone line is approximately 1 MHz. However, conventional analog signals that carry voice over these lines operate in a 4 kHz bandwidth. Advantageously, ADSL takes advantage of the remaining portion of the 1 MHz bandwidth. Specifically, ADSL technology effectively subdivides the 1 MHz bandwidth of the copper twisted pair line into three information channels: i) a high speed downstream channel, ii) a medium speed duplex (upstream/downstream) channel, and iii) a conventional voice channel. Downstream refers to transmissions from the telephone network to the ADSL modem located at a subscriber site, while upstream is the route from the subscriber site to the telephone network. This multichannel approach enables subscribers to access the internet, order a video for viewing and send a facsimile or talk on the telephone all at the same time.

Figure 1:
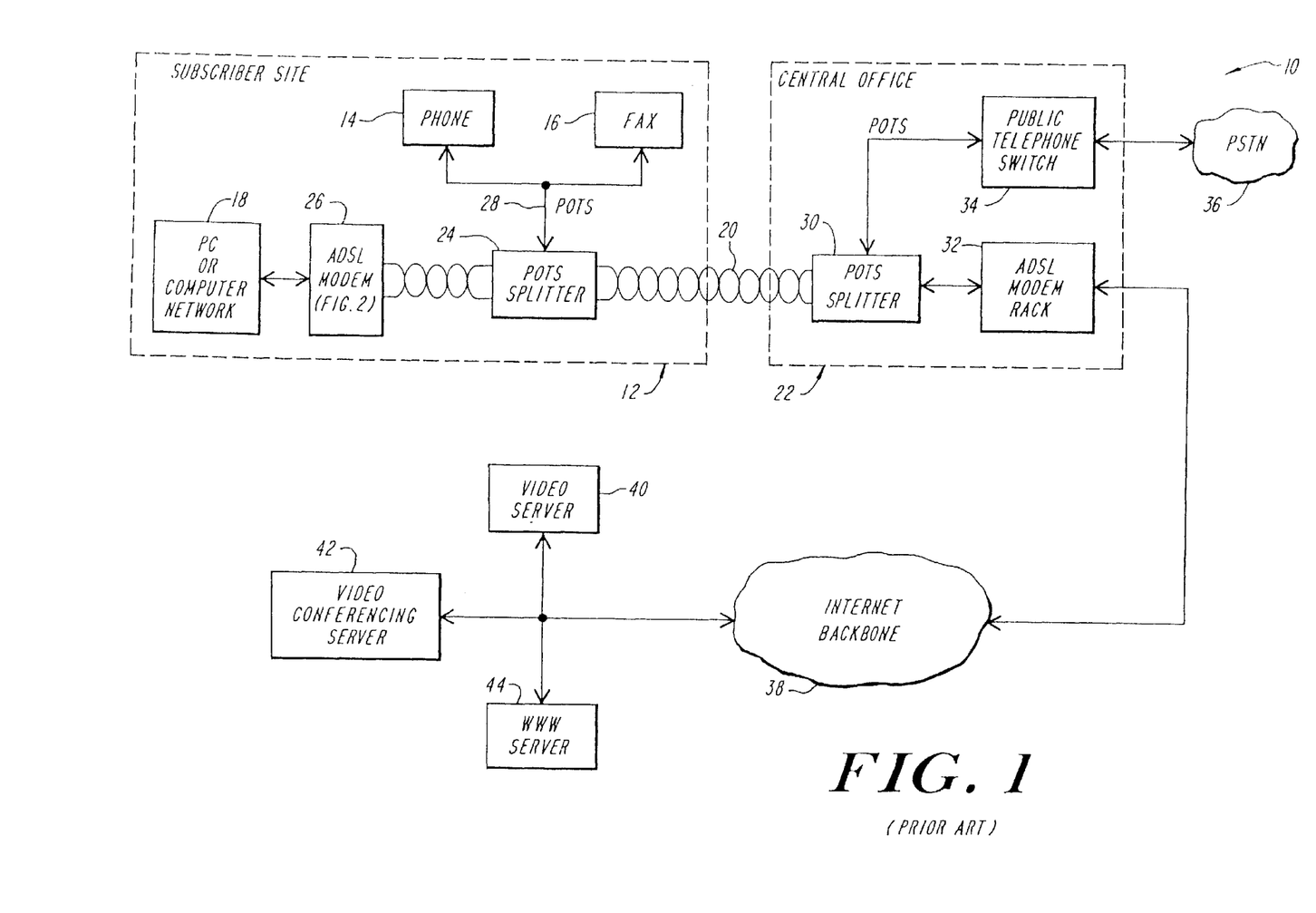
FIG. 1 is a communication system 10 that employs DSL technology.

FIG. 1 illustrates a communication system 10 that employs ADSL technology. The system 10 includes a subscriber site 12, which includes a phone 14, a facsimile machine 16 and a personal computer or computer network 18. The subscriber site 12 receives a twisted pair of copper telephone lines 20 that connect the subscriber site with a telephone central office 22. The run length of the telephone line 20 between the subscriber site and the central office 22 is typically 12,000 feet and it could reach 18,000 feet. A POTS splitter 24 located at the subscriber site 12 is connected to the telephone line 20 and couples the telephone line to an ADSL modem 26 and to the phone 14 and facsimile machine 16.

Central office 22 includes a POTS splitter 30 that is operatively connected to an ADSL modem rack 32 and to a public telephone switch 34. As known, the public telephone switch 34 communicates over a public switch telephone network 36. The ADSL modem rack 32 also communicates over the public switch telephone network and is connected via an internet backbone 38 to various devices including a video server 40, a video conferencing server 42 and a World Wide Web server 44.

Figure 2:
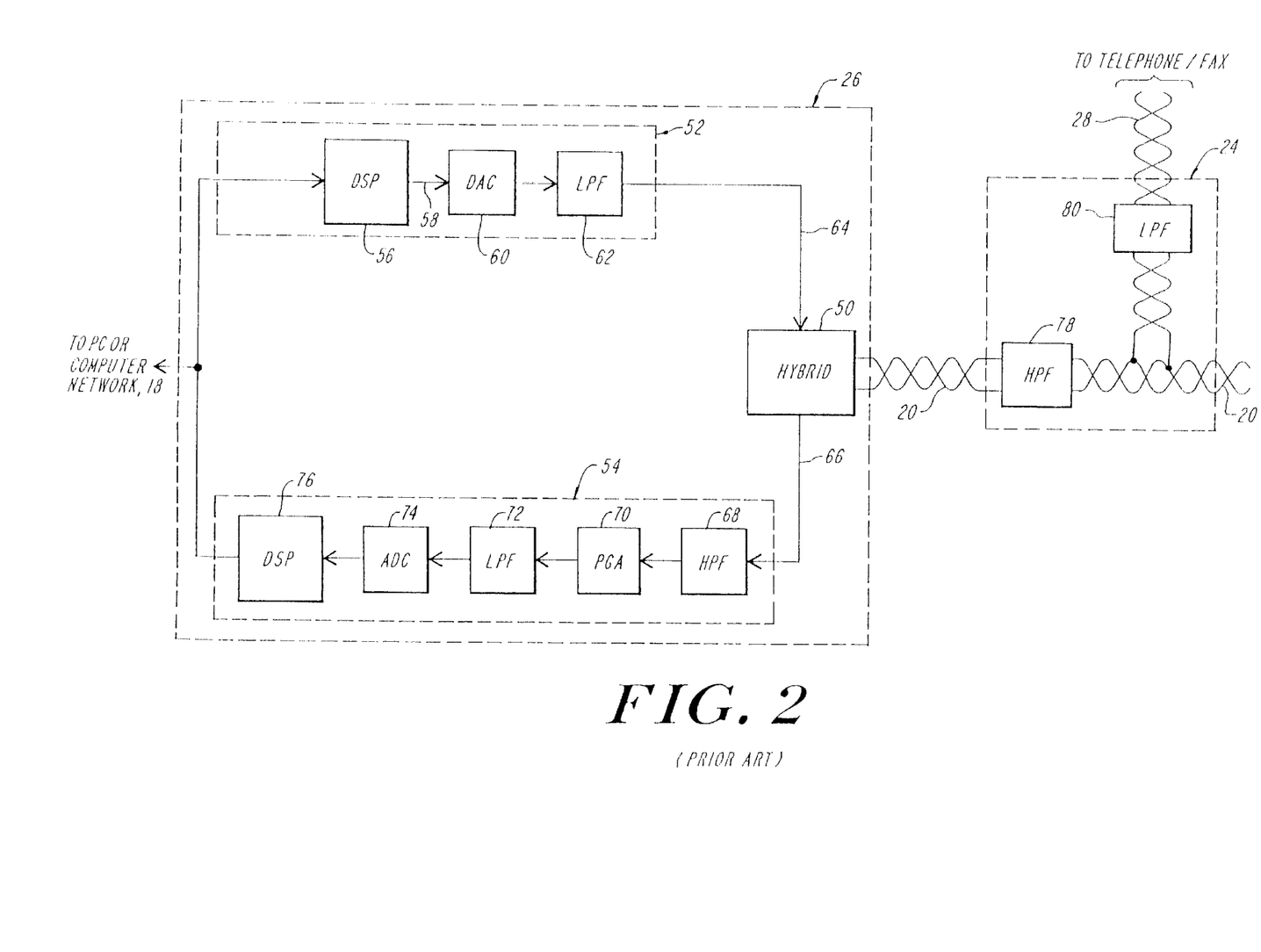
FIG. 2 is a functional block diagram illustration of a DSL modem 26 and POTS splitter 24.

FIG. 2 is a functional block diagram illustration of the ADSL modem 26 and the POTs splitter 24. The modem 26 includes a hybrid circuit 50 that couples a transmit circuit 52 and a receive circuit 54 to the telephone line.

The transmit circuit 52 includes a digital signal processor (DSP) 56 that provides a digitized transmit signal on a line 58 to a digital-to-analog converter (DAC) 60. The resultant analog signal is input to a low pass filter (LPF) 62 and a filtered transmit signal is provided on a line 64 to the hybrid circuit 50.

The receive circuit 54 receives a signal on a line 66 and includes a high pass filter 68, a programmable gain amplifier 70, a low pass filter 72, an analog-to-digital converter (ADC) 74 and a DSP 76 which together process the signal on the line 66 in a known manner.

The POTs splitter 24 includes a high pass filter 78 and a LPF 80. The LPF 80 has a cut-off frequency set at approximately 4 kHz in order to allow the voice band signal to pass onto the line 28. The HPF 78 filters signals that are transmitted and received by the modem. Therefore, the cut-off frequency of the HPF 78 can be set at no higher than about 30 kHz to ensure that signals from the transmit circuit 52 pass relatively unattenuated through the POTS splitter. In addition, the hybrid 50 is typically used to terminate the HPF 78 in this embodiment.

Attenuation caused by the twisted pair is not constant over frequency spectrum. That is, the telephone line attenuates high frequency components within the received signal spectrum more than lower frequency components. To compensate for signal losses due to the cable/wire, a programmable gain amplifier (PGA) is typically placed in front of the analog-to-digital converter (ADC). The function of the PGA is to amplify the received signal and to increase/maximize the dynamic range of ADC. However, the PGA gain is flat over the frequency band. Therefore, after amplification, the low frequency components will still have a much higher amplitude than the high frequency components. As a result, the dynamic range of ADC is often limited by the low frequency signals. This leads to a situation where the dynamic range of ADC needs to be greater in order to achieve required signal-to-noise ratio (SNR) for system performance.

The amount of signal gain to be provided is further complicated by the fact that signal attenuation increases with the length of the copper wire. Since the distance between the subscriber site and the central office varies considerably (e.g., generally between 12 and 18 kilo-feet), modems at different subscriber sites will see various levels of high frequency signal attenuation. Moreover, signal attenuation is also a function of temperature and copper conditions that are not easily controlled. Hence, modems may experience different degrees of copper loss over time.

Therefore, there is a need for an adaptive equalizer that compensates for the attenuation of the high frequency components, while leaving the lower frequency components relatively unchanged.

SUMMARY OF THE INVENTION

An object of the present invention is to provide an adaptive equalizer to compensate for signal attenuation at high frequencies in the receive path of a broadband communications device.

Briefly, according to the present invention, a broadband communications system includes a receive circuit path and a hybrid circuit. The hybrid circuit provides a receive signal to the receive circuit path that comprises an adaptive equalizer circuit, which conditions the received signal and provides a compensated received signal that is processed by the receive path circuit. In a preferred embodiment, the broadband communications system includes a modem.

The adaptive equalizer is an adaptive analog filter that provides different degrees of high frequency boosts to the received signal, while retaining a relatively constant phase shift for each boost setting. The response of the equalizer is controlled by a control circuit (e.g., a digital signal processor) to compensate for the high frequency signal attenuation primarily caused by the signal path. For example, the signal path may include a telephone line between the communications system (e.g., a modem) and the central office. The dynamic response of the equalizer is selected based upon the characteristics of the signal path which the receive signal travels along.

The equalizer may receive single ended or doubled ended signals.

Advantageously, the equalizer conditions the received signal to ensure efficient utilization of the dynamic range of the ADC located in the receive circuit path. The equalizer is suitable for on-chip implementation, resulting in lower cost and power consumption.

These and other objects, features and advantages of the present invention will become apparent in light of the following detailed description of preferred embodiments thereof, as illustrated in the accompanying drawings.

DETAILED DESCRIPTION OF THE INVENTION

The present invention shall be discussed in the context of use in a modem. However, one of ordinary skill will appreciate that the equalizer of the present invention is not limited to use in a modem. Indeed, it may be used in virtually any communications system desiring adaptive equalization.

Figure 3:
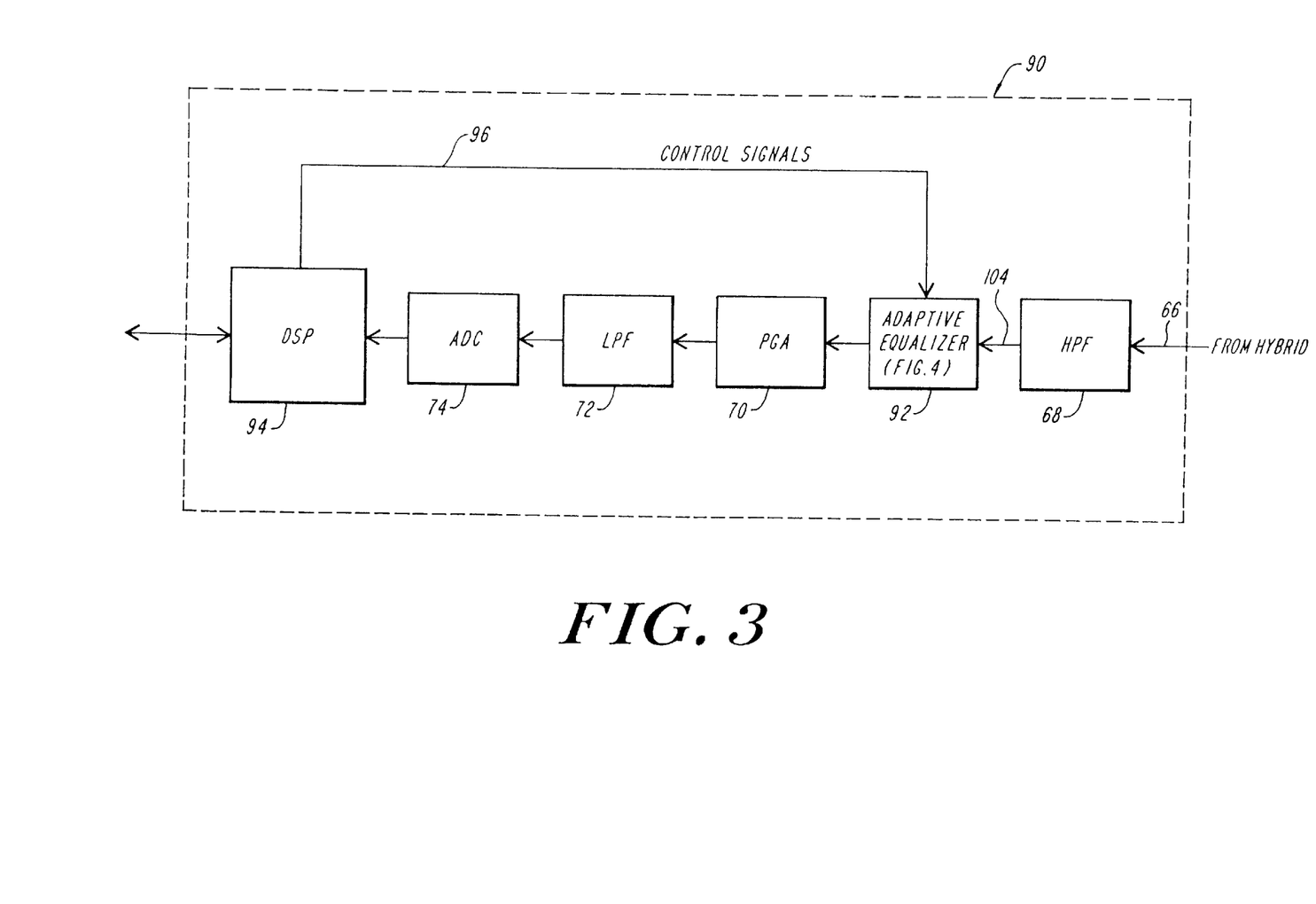
FIG. 3 illustrates a functional block diagram of a modem receive circuit according to the present invention.

FIG. 3 illustrates a functional block diagram of a broadband modem receive circuit path 90 that employs an adaptive equalizer 92 according to the present invention. The receive circuit path 90 is substantially similar to path 54 in the modem 26 illustrated in FIG. 2, with the principal exception of the addition of the adaptive equalizer 92. In addition, to select the desired response from the adaptive equalizer 92, a DSP 94 provides control signals on a line 96 to the equalizer. In a preferred embodiment, the receive circuit path (with the exception of the HPF 68 and the DSP 76) is located on an integrated circuit. Alternatively, the receive circuit and/or the equalizer may be constructed from discrete components.

Figure 4:
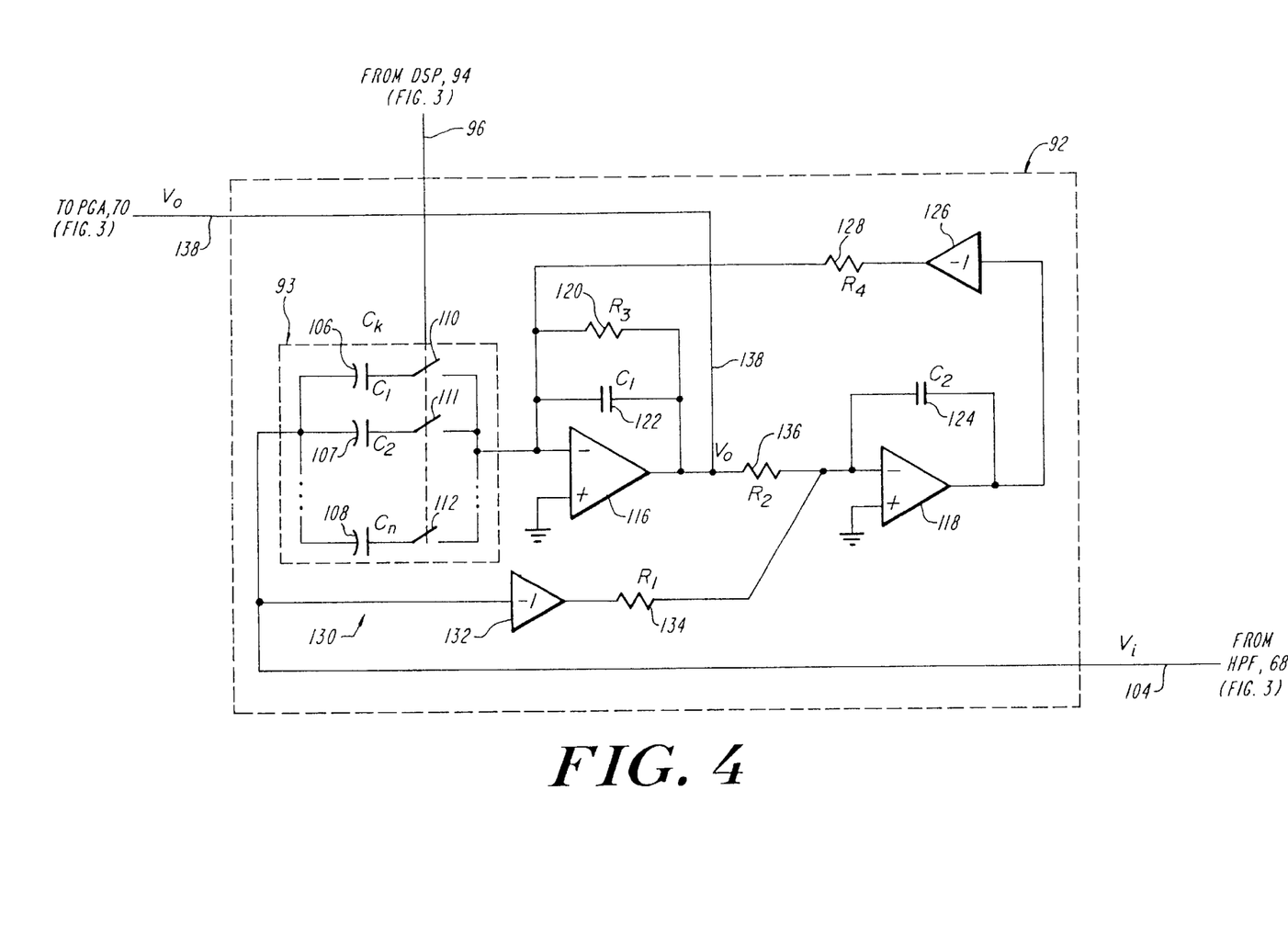
FIG. 4 illustrates a schematic diagram of an embodiment of the adaptive equalizer.

FIG. 4 illustrates a schematic diagram of an embodiment of the adaptive equalizer 92. The equalizer has the topology of a biquadratic filter. The equalizer 92 receives a filtered signal on a line 104 from the HPF 68 (FIG. 3). The equalizer includes a capacitor network 93 comprising a plurality of parallel capacitors $C_1$–$C_n$ 106–108 that are each input to an associated one of a plurality of switches 110–112. Each of the switches 110–112 is individually controllable in response to control signals on the line 96. Significantly, by opening and closing 5 various combinations of the switches 110–112, the resultant capacitance from the network 93 can be set to a desired value $C_k$. The significance of this adaptive/programmable feature shall be discussed in detail hereinbelow.

The equalizer 92 also includes a first operational amplifier 116 and a second operational amplifier 118 connected in cascade with negative feedback around each of the amplifiers. Specifically, the first operational amplifier 116 includes a negative feedback path having a resistor $R_3$ 120 and a capacitor $C_1$ 122 arranged in parallel. The second operational amplifier 118 includes a capacitor $C_2$ 124 that is connected between the output and the negative input of the second amplifier 118.

The equalizer also comprises a feedback path from the output of the second amplifier 118 to the negative input of the first amplifier 116. The feedback path includes a unity gain inverting amplifier 126 and a series resistor $R_4$ 128. The virtual grounds available at the inputs of the two operational amplifiers 116, 118 allow signals to be summed directly.

The equalizer 92 also includes a feedforward path 130 from the input signal on the line 104 to the negative input of the second amplifier 118. This path 130 comprises a unity gain inverting amplifier 132 and a series resistor $R_1$ 134. Significantly, the unity gain inverting amplifier 132 on this feedforward path moves the location of the zeros from the jω-axis onto the real axis. A resistor $R_2$ 136 is connected between the output of the first amplifier 116 and the negative input of the second amplifier 118. The equalizer output $V_O$ is provided on a line 138 from the output of the first amplifier 116.

Figure 5:
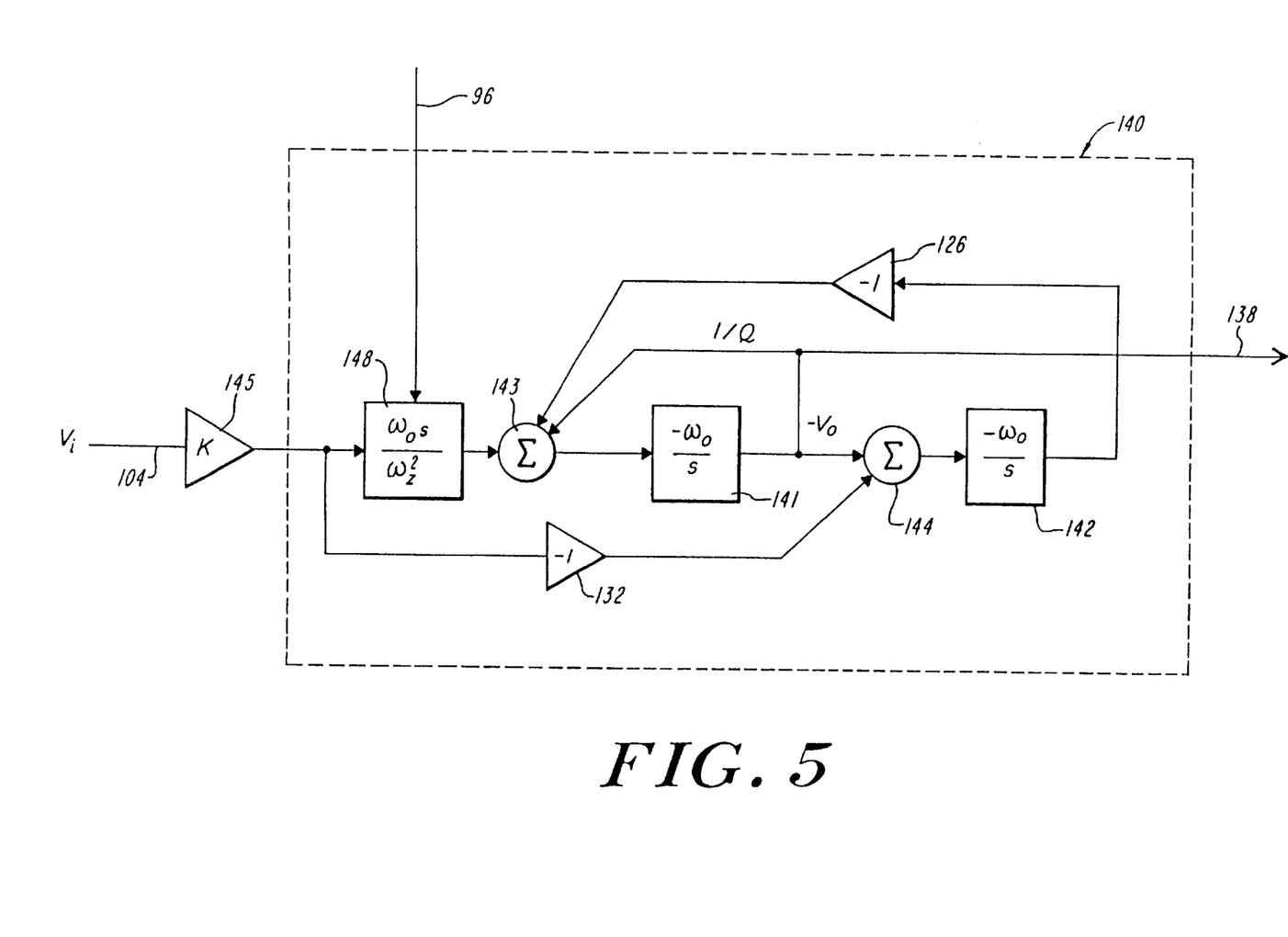
FIG. 5 illustrates a Laplacian block diagram of the adaptive equalizer.

FIG. 5 illustrates a Laplacian block diagram 140 of the equalizer schematically illustrated in FIG. 4. Two negative integrators 141, 142 are connected in cascade in an overall feedback loop. These integrators represent the two Miller integrators illustrated in FIG. 4. That is, referring to FIGS. 4 and 5, opamp 116 and capacitor 122 form the basis of integrator 141, while opamp 118 and capacitor 124 form the basis of integrator 142. Summation operators 143, 144 represent the signal summation that occurs at the negative inputs of the opamps 116, 118 (FIG. 4), respectively. The 1/Q gain feedback path around the first integrator 141 represents the function of the damping resistor $R_3$ 120 (FIG. 4). The scalar operator K 145 (FIG. 5) represents the dc gain of the equalizer, which corresponds to the ratio of resistor $R_2$ 136 to resistor $R_1$ 134 (FIG. 4). Functional block 148 represents the programmable capacitor network 93 (FIG. 4), which realizes the zeroes of the equalizer transfer function.

Significantly, the programmable capacitor network 93 (FIG. 4) is responsible for the programmable high-frequency boost by changing the location of the zeroes (i.e., $\omega_z$). Referring to FIG. 5, note that when $\omega_z$ is pushed to infinity, the feedforward path to the first integrator is effectively eliminated, and the Laplacian block diagram 140 simplifies to a conventional lowpass filter.

The transfer function H(s) for the equalizer can be derived from FIG. 5 and written as follows:

$$H(s) = K \cdot \left(\frac{\omega_0}{\omega_z}\right)^2 \left(\frac{s^2 - \omega_z^2}{s^2 + \left(\frac{\omega_0}{Q}\right)s + \omega_0^2}\right) \quad \text{(EQ. 1)}$$

The filter poles, Q, K and zeroes can be written in terms of circuit components (FIG. 4) as:

$$\omega_o = \pm\sqrt{\frac{1}{R_2 C_2 R_4 C_1}} \quad \text{(EQ. 2a)}$$

$$Q = \sqrt{\frac{C_1 R_3^2}{C_2 R_2 R_4}} \quad \text{(EQ. 2b)}$$

$$K = -\frac{R_2}{R_1} \quad \text{(EQ. 2c)}$$

$$\omega_z = \sqrt{\frac{1}{R_1 R_4 C_2 C_k}} \quad \text{(EQ. 2d)}$$

EQs. 2a–2d illustrate that there is a high degree of freedom to realize a particular set of biquadratic filter characteristics (namely, the $\omega_0$, Q, and K) with different values for the R's and C's. For example, in one embodiment one may set $R_2=R_1=R_a$ so that the magnitude of the equalizer DC gain is unity. In addition, one may assign $R_3=R_4=R_b$, and $C_1=C_2=C$. One of ordinary skill in the art will recognize that these values represent one of many different configurations for the analog adaptive equalizer. A designer familiar with the art can easily come up with numerous different configurations of the analog adaptive equalizer to achieve the particular design requirements. Therefore, with these substitutions EQs. 2a–2d can be rewritten as:

$$\omega_o = \sqrt{\frac{1}{R_a R_b C^2}}$$

$$Q = \sqrt{\frac{R_b}{R_a}}$$

$$K = -1$$

$$\omega_z = \sqrt{\frac{1}{R_a R_b C C_k}}$$

From EQ. 1, the magnitude of the equalizer gain at high-frequency (i.e., at s goes to infinity) is determined by the square of the ratio between the pole and the zero, which is $$\left(\frac{\omega_0}{\omega_z}\right)^2.$$

Therefore, the equalizer high-frequency can be programmed by varying the zero location (assuming fixed poles—for reasons to be discussed shortly). This is achieved by configuring the capacitor network 93 (FIG. 4) to provide the appropriate capacitance.

When the distance of the channel is short, high frequency boost is not required because the high frequency attenuation is relatively small. Therefore, the equalizer is configured as a lowpass filter by configuring the capacitor network 93 (FIG. 4) to place the zeros at a very high frequency. Then, the transfer function H(s) set forth in EQ. 1 simplifies to a second order low pass filter, which can be expressed as:

$$H(s) = -\frac{\omega_0^2}{s^2 + \left(\frac{\omega_0}{Q}\right)s + \omega_0^2} \quad \text{(EQ. 1a)}$$

Figure 6:
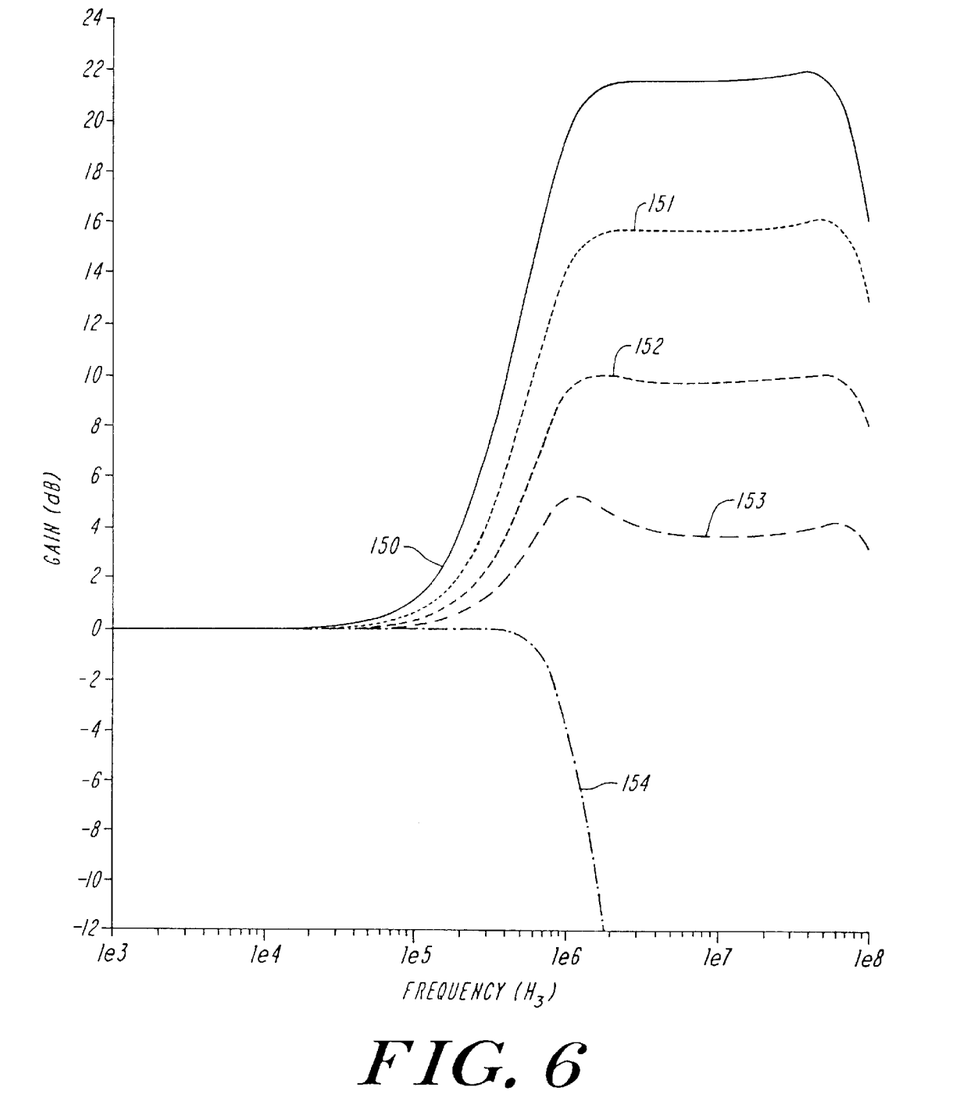
FIG. 6 illustrates some typical magnitude responses of the analog adaptive equalizer.

As an example, FIG. 6 illustrates a plot of gain (in dB) versus frequency (Hz) of the typical equalizer output signal on the line 138 (FIG. 4) for five different equalizer configurations. Gain is plotted along a vertical axis and frequency is plotted along a horizontal axis on a log scale. The plots were generated by computer simulation. In a first plot, gain versus frequency is plotted along a line 150. As shown, the gain of the system is about 0 dB until approximately 100 kHz where the gain increases to approximately 22 dB at around 2 MHz. The gain plotted along the line 150 begins rolling off at approximately 30 MHz due to parasitics and the finite bandwidth of the amplifier. If less gain is required then the DSP 94 (FIG. 3) configures the equalizer 92 to provide one of the other selectable responses plotted along lines 151–154.

Referring to FIGS. 4 and 6, to configure the equalizer 92, the DSP 94 (FIG. 3) provides the command signal on the line 96. The command signal sets the position of the individually controllable switches 110–112. $C_k$ is equal to the sum of the capacitance's for the switches that are closed. For example, if only switch 110 is closed, then $C_k$ is equal to the value of $C_1$ 106. If switches 110 and 111 are closed, and the remaining switches are open, then $C_k$ is equal to the value ($C_1+C_2$) since the capacitors sum in parallel. Similarly, if switches 111 and 112 are closed while switch 110 is open, then $C_k$ will be equal to the value of ($C_2+C_n$). It is contemplated that the capacitive network may also include series capacitors that can be short circuited by closing a switch (not shown) that is parallel to the capacitor.

The capacitive network 93 (FIG. 4) provides the largest capacitance (i.e., $C_k$) to obtain maximum boost (i.e., smallest $\omega_z$). To decrease the system boost, the value of $C_k$ is reduced. For a low pass response, all the switches 110–112 are opened, which moves the zeroes $\omega_z$ to infinity. It should be noted that since the two zeroes of the second order equalizer 92 are realized by the capacitive network 93 (FIG. 4), the zeroes will lie on the real axis and be symmetrical about the imaginary axis (i.e., j$\omega$-axis). Therefore, the phase response of the equalizer remains substantially the same for all boost settings.

Figure 7:
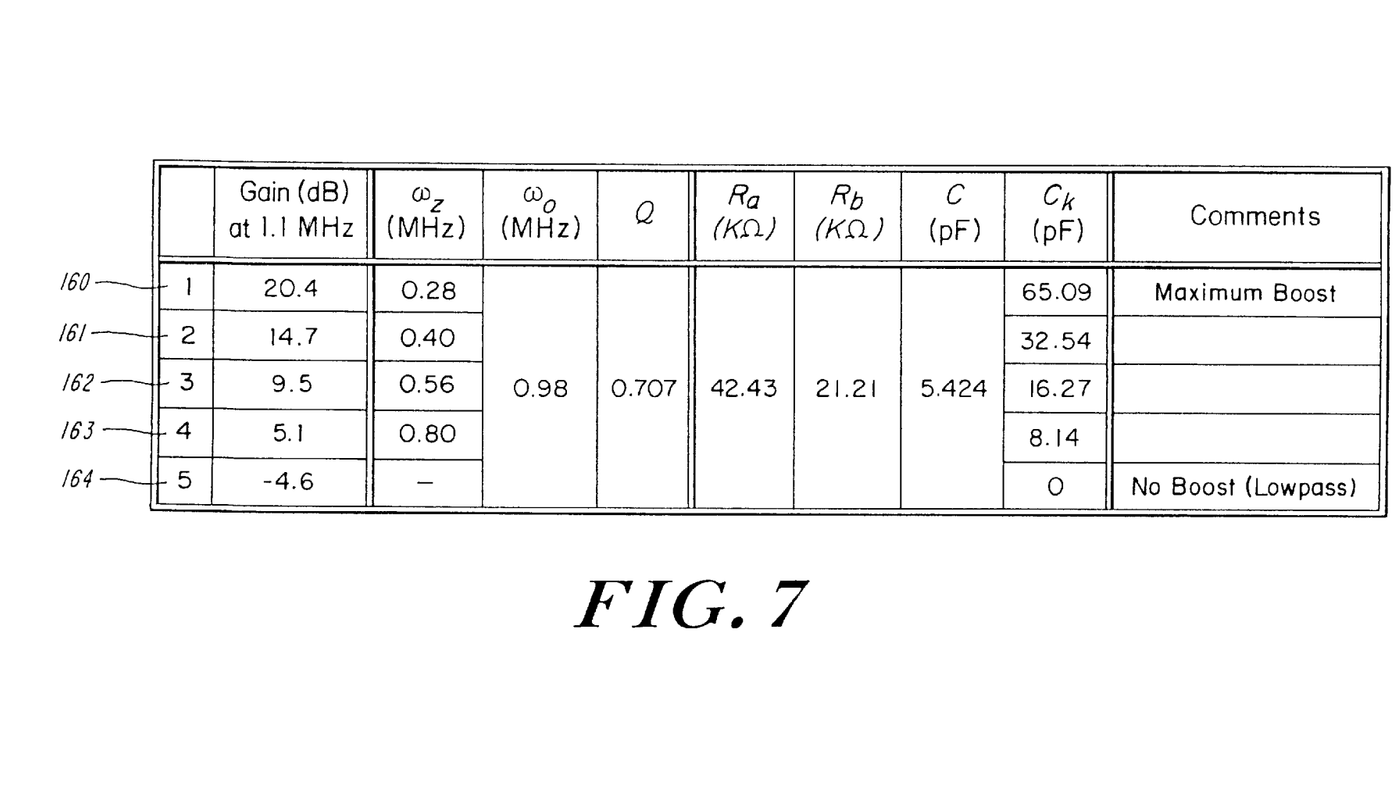
FIG. 7 is a table that identifies the component values for the five equalizer configurations that were used to generate the plots illustrated in FIG. 6.

FIG. 7 is a table that identifies the component values for the five equalizer configurations that were used to generate the plots illustrated in FIG. 6. Referring to FIGS. 6 and 7, the plot on the line 150 (FIG. 6) is associated with the equalizer configuration specified on a first 160 line on the table. Specifically, $R_a$=42.43 kohms, $R_b$=21.21 kohms, C=5.424 pF and $C_k$=65.09 pF. This results in $\omega_z$=0.28 MHz, $\omega_0$=0.98 MHz, Q=0.707 and a gain of about 20.4 dB at 1.1 MHz. The plot on the line 151 (FIG. 6) is associated with the equalizer configuration specified on a second line 161 of the table. Specifically, $R_a$, $R_b$ and C remain unchanged, while the capacitive network 93 (FIG. 4) is set so $C_k$=32.54 pF. This results in $\omega_z$=0.40 MHz, $\omega_0$=0.98 MHz, Q=0.707 and a gain of about 14.7 dB at 1.1 MHz. Similarly, the plots on lines 152–154 (FIG. 6) are associated with the equalizer configurations specified on lines 162–164 respectively, of the table set forth in FIG. 7. The Q of the equalizer is selected to be 0.707 for a flat response. Referring to FIG. 7, for each gain reduction of approximately 6 dB at 1.1 MHz, the value of $C_k$ is cut in half.

Figure 8:
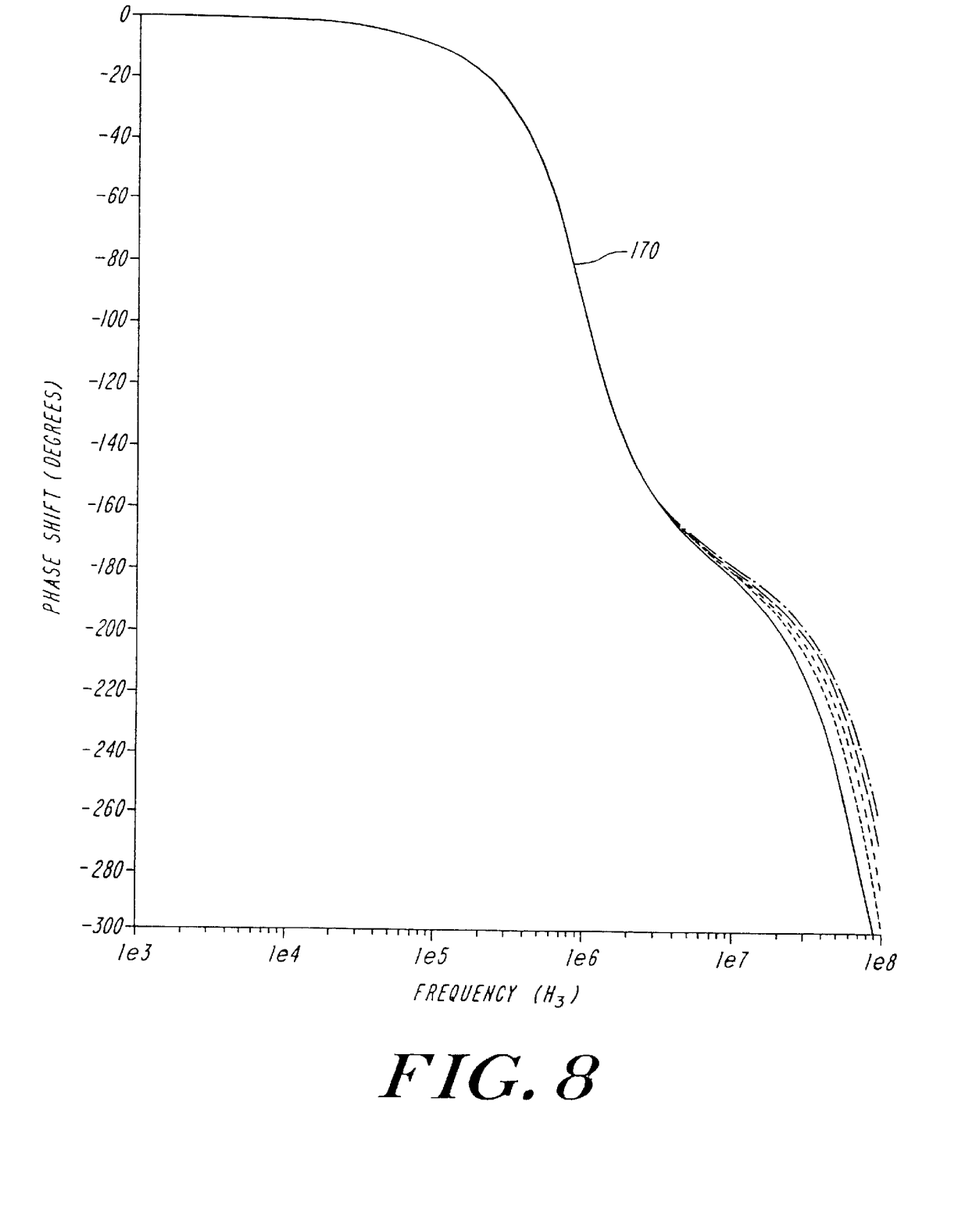
FIG. 8 illustrates a plot of phase shift versus frequency for each of the equalizer configurations specified in FIG. 7.

FIG. 8 illustrates a plot of phase shift versus frequency for each of the equalizer configurations specified in FIG. 7. Phase shift is plotted along a vertical axis and frequency is plotted along a horizontal axis. Notably, the phase shift versus frequency characteristics are almost identical for the various equalizer configurations within the operational spectrum of the receive circuit path (i.e., several kHz to about 1.1 MHz). That is, phase shift as a function of frequency is plotted along a line 170 for the equalizer configurations in FIG. 7. A key to adaptive equalization of the present invention is that the phase shift versus frequency needs to be relatively the same for each of the equalizer configurations. Specifically, phase shift as a function of frequency should track for the various adaptive settings. To ensure this relationship, the zeros of the equalizer should appear as mirror-images around the imaginary axis. Therefore, their contributions to the phase are mutually cancelled. In other words, the phase will be determined by the pole locations of the equalizer. Significantly, the equalizer 92 provides the ability to select one of a plurality of high-frequency boosts by adjusting the zero locations only (while the poles are fixed).

Figure 9:
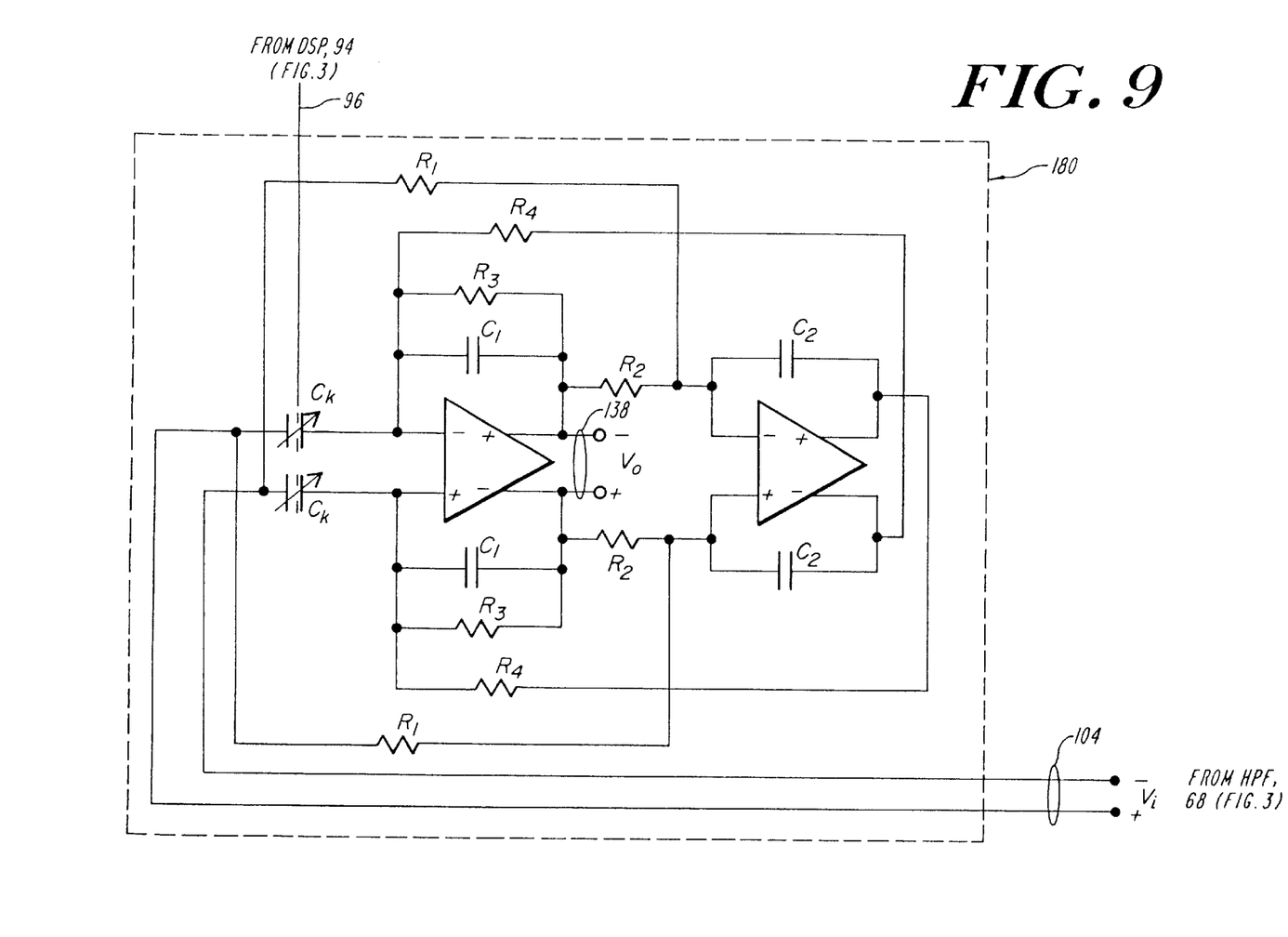
FIG. 9 illustrates an alternative embodiment adaptive equalizer that is suitable for use with double ended/balanced signals.

FIG. 9 illustrates an alternative embodiment equalizer 180 that is suitable for use with double ended signals. One of ordinary skill will recognize that by interchanging the opamp output terminals, signal inversion is readily obtained, thus allowing the two inverting amplifiers 132, 126 in FIG. 4 to be removed from this alternative embodiment. This fully balanced equalizer 180 has improved linearity and immunity from substrate noise in contrast to the single ended embodiment illustrated in FIG. 3.

The equalizer embodiments illustrated in FIGS. 4 and 9 are based on a biquadratic transfer function having two complex poles and two real zeroes. Significantly, if the poles are fixed, the zeros are shifted (by controlling capacitance $C_k$) to provide the desired high frequency boost, or to provide a lowpass response. In addition, since the zeroes are symmetrical around the jω-axis, the same phase shift versus frequency relationship can be maintained regardless of the selected equalizer configuration (i.e., boost settings). However, one of ordinary skill in the art will recognize that the present invention is not limited to a second order equalizer. It is contemplated that the equalizer may be a higher order at the expense to additional circuitry. In addition, although the analog adaptive equalizer has been described in the context of being used in a modem, it is contemplated that the adaptive equalizer may be employed in essentially any communication system where it is desirable to employ an adaptive equalizer, which ensures that the phase shift versus frequency remains the same within a predetermined frequency range for various equalizer boost settings.

Although the present invention has been shown and described with respect to several preferred embodiments thereof, various changes, omissions and additions to the form and detail thereof, may be made therein, without departing from the spirit and scope of the invention.

What is claimed is:

1. An analog adaptive equalizer, said equalizer comprising:

a capacitive network that receives an input signal and includes a plurality of switchable capacitors that together provide a network capacitance value $C_k$ and a filtered signal; and means, responsive to said input signal and said filtered signal, for filtering said filtered signal to provide one of a plurality of responses with boost within a predetermined frequency range, while ensuring that phase shift versus frequency of said equalizer within the predetermined frequency range remains relatively the same for each of the dynamic responses.

2. The analog adaptive equalizer of claim 1, wherein said capacitive network includes a plurality of parallel capacitors that are programmably configured to provide said one of a plurality of responses.

3. The analog adaptive equalizer of claim 2, wherein said means for filtering comprises a biquadratic filter.

4. The analog adaptive equalizer of claim 3, wherein said equalizer is located on an integrated circuit.

5. A broadband modem, comprising:

a transmit circuit;

a receive circuit comprising an analog adaptive equalizer;

a coupling circuit that couples said transmit circuit and said receive circuit to a telephone line; and wherein said receive circuit receives a received signal from said coupling circuit and provides a signal indicative of said received signal to said analog adaptive equalizer that can be configured to provide any one of a plurality of selected responses within a desired frequency range, while ensuring that phase shift versus frequency of said equalizer within the desired frequency range remains relatively the same for each of the selected responses.

6. The broadband modem of claim 5, wherein said analog adaptive equalizer includes a capacitive network that is programmably configured to provide a desired capacitive value $C_k$ and the selected equalizer response.

7. The broadband modem of claim 6, wherein said analog adaptive equalizer includes a biquadratic filter.

8. The broadband modem of claim 7, wherein said receive circuit is located on an integrated circuit.

9. The broadband modem of claim 7, wherein said analog adaptive equalizer is constructed of discrete circuit components.

10. The broadband modem of claim 7, wherein said receive circuit includes a digital controller that provides control signals to said capacitive network to set said desired capacitive value $C_k$.

11. The broadband modem of claim 7, wherein said analog adaptive equalizer comprises:

a capacitive network that is programmably configured to provide said desired capacitive value $C_k$, and receives said a signal indicative of said received signal, and provides a high passed signal;

a first amplifier having an input node and an output node that provides a first amplifier output signal;

a first feedback capacitor that receives said first amplifier output signal and provides a filtered feedback signal;

a first feedback resistor that receives said first amplifier output signal and provides a conditioned feedback signal;

a series resistor that receives said first amplifier output signal and provides a conditioned first amplifier output signal;

a second amplifier having an input node and an output node that provides a second amplifier output signal;

a second feedback capacitor that receives said second amplifier output signal and provides a second filtered feedback signal;

a feedforward signal path responsive to said signal indicative of said received signal and having a series connected inverter and a resistor that provide a feedforward signal;

a feedback path responsive to said second amplifier output signal and having a series connected inverter and a resistor that provide an amplifier feedback signal; wherein said high passed signal, filtered feedback signal, said conditioned feedback signal and said amplifier feedback signal are summed and input to said first amplifier input node; and said feedforward signal, said conditioned first amplifier output signal and said second filtered feedback signal are summed and input to said second amplifier input node.

12. A method of adjusting the system dynamics of an adaptive equalizer circuit located in a broadband communications system and that provides a dynamically compensated received signal to an analog-to-digital converter (ADC), the method comprising the step of:

adjusting the location of zeroes of the adaptive equalizer to provide a desired equalizer response within a predetermined frequency range while ensuring that phase shift versus frequency relationship of the adaptive equalizer remains the same within the predetermined frequency range.

13. The method of claim 12, wherein said step of adjusting comprises the steps of:

first sensing the condition of a telephone line that connects the communications system and a central telephone switching office, and providing a sensed signal indicative thereof; and modifying the zero locations of the equalizer based upon said sensed signal to tune the dynamic response of the equalizer.

14. The method of claim 13, wherein the location of the zeros are adjusted by setting the capacitance value of a high pass filtering capacitor network.

15. The method of claim 12, wherein the communications system comprises a modem.

16. A method of adaptively adjusting the gain of high frequency components within a received signal, the method comprising:

processing the received signal in an adaptive equalizer circuit having a plurality of gain settings, to generate an equalized signal, and selecting one of the gain settings to provide a desired equalizer response within a predetermined frequency range of the received signal, while ensuring that phase shift versus frequency relationship of the equalized signal remains relatively constant within the predetermined frequency range.

* * * * *